United States Patent [19]

Slagle

[11] Patent Number: 4,549,119
[45] Date of Patent: Oct. 22, 1985

[54] CONTROL SYSTEM AND METHOD FOR OPERATING MINING MACHINE TRACTION MOTORS AND THE LIKE

[75] Inventor: Richard M. Slagle, Grove City, Pa.

[73] Assignee: Joy Manufacturing Company, Pittsburgh, Pa.

[21] Appl. No.: 604,750

[22] Filed: Apr. 27, 1984

[51] Int. Cl.[4] .............................................. H02P 7/72
[52] U.S. Cl. .................................. 318/11; 318/345 C; 318/809
[58] Field of Search ................. 318/83, 345 C, 345 D, 318/314, 809, 111; 364/426

[56] References Cited

U.S. PATENT DOCUMENTS

| | | | |
|---|---|---|---|
| 3,800,197 | 3/1974 | Mehta | 318/111 X |
| 3,803,465 | 4/1974 | Akamatsu | 318/111 X |
| 4,042,864 | 8/1977 | Norris | 318/301 |
| 4,282,466 | 8/1981 | Matty | 318/332 X |

FOREIGN PATENT DOCUMENTS 54-9820  7/1979  Japan .................................. 318/111

*Primary Examiner*—William M. Shoop, Jr.
*Assistant Examiner*—Bentsu Ro
*Attorney, Agent, or Firm*—Raymond W. Augustin

[57] ABSTRACT

Method and apparatus for controlling DC traction motors on opposite sides of a vehicle, particularly a mining machine, by means of an SCR converter. The motors are accelerated while controlling the firing angles of the SCR's such that the current and voltage supplied to the motors increase along ramps until desired normal operating values of voltage and current are reached with the voltage across the series-connected motors being of a substantially greater value than the value it would be if the motors were connected in parallel. In contrast to prior art systems, the traction motors are maintained in a series-connected configuration during normal, essentially steady-state operation; while the voltage across the motors is maintained at said substantially higher value. When one of two drive wheels connected to the traction motors is slipping, the motors are connected in parallel to increase torque with a corresponding decrease and increase in voltage and current, respectively. By virtue of the fact that the motors operate in series during normal, sustained operation, the total current drawn by the motors is reduced, thereby reducing heating effects and the necessity of large diameter power lead-in cables.

10 Claims, 6 Drawing Figures

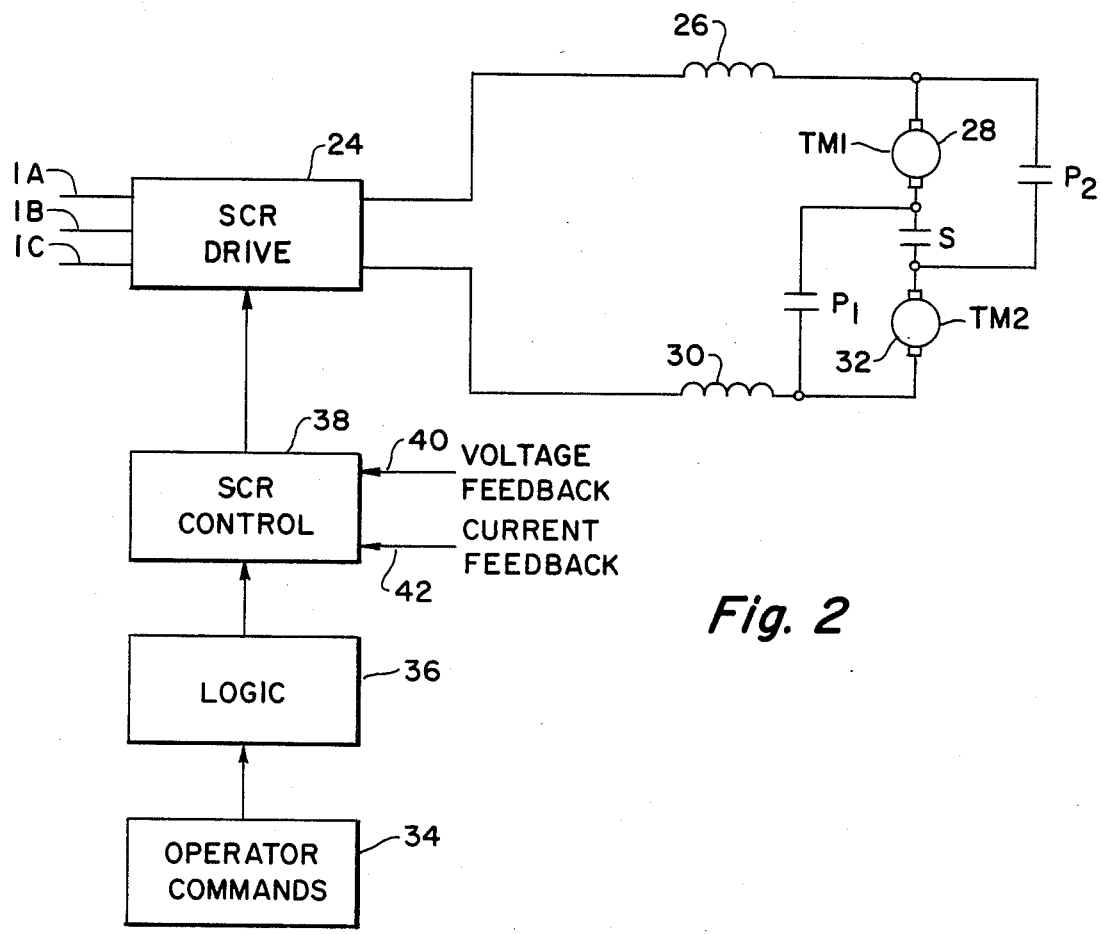
*Fig. 2*
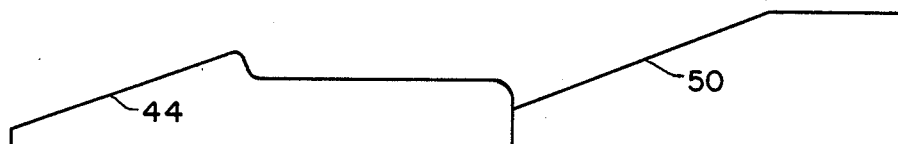
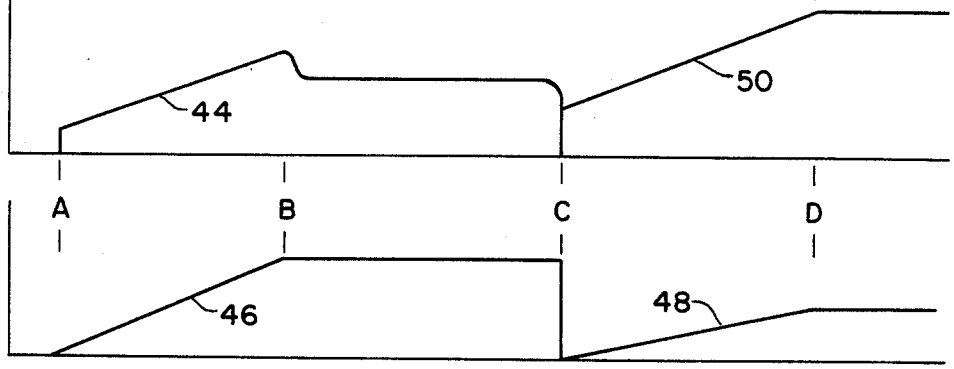
*Fig. 3A* CURRENT
*Fig. 3B* VOLTAGE

CONTROL SYSTEM AND METHOD FOR OPERATING MINING MACHINE TRACTION MOTORS AND THE LIKE

BACKGROUND OF THE INVENTION

While not limited thereto, the present invention is particularly adapted for use with mining machines of the type wherein separate traction motors are used on opposite sides of the machine. In a mine shuttle car, for example, electrical energy is supplied to the car by means of a cable which is unwound from a reel as the car travels in one direction and reeled back onto the reel as the direction of car movement is reversed. In common types of power supply systems for such mining machines, AC power is supplied to the machine through the aforesaid cable. This AC power is then converted to DC power by means of a phase-controlled SCR bridge converter carried on the machine, the DC power being used to drive the DC traction motors.

In the past, DC traction motors of this type were normally connected in parallel during normal, sustained operation of the machine; but were sometimes connected in series under starting conditions at half speed, the half speed condition being effected by virtue of the fact that the voltage across each individual motor was halved in the series mode. Since the power supplied to the traction motors is the product of voltage times current (i.e., P=EI); and since the voltage across traction motors connected in parallel is the same, power can be increased only by increasing current. Increased current to the traction motors, however, increases the current passing through the aforesaid cable leading to the mining machine, resulting in increased heat generation and the possible requirement for heavier or larger diameter cable. A showing of traction motors connected in parallel can be found, for example, in U.S. Pat. No. 4,042,864 wherein a single full-wave rectifier bridge is used to drive the two motors. In actual practice, however, it has been common to use separate rectifiers or separate SCR AC-DC converters, one for each motor. The use of two power packs, of course, increases costs, complexity and space requirements of the drive system, a factor which is deleterious in mining machines and the like where space and reliability are at a premium.

While heat generation can be reduced by operating the motors in series, series operation is undesirable when, because of mine floor conditions, one of the two drive wheels on the mining machine is slipping. Under these circumstances, increased torque is required on the wheel which is not slipping so that, for a given voltage at the output of the SCR bridge converter, parallel operation is desired such that current through the respective motors can be increased. Thus, while series operation under normal running conditions is desired to reduce current and consequent heating effects, occasions arise where parallel operation is highly desired.

Direct current traction motors for mining machines and other similar vehicles normally employ series field windings wherein the field winding carries the current that flows through the armature. During regeneration in a series motor of this type, voltage generated varies as a function of speed times current. In the past, the maximum attainable voltage was set and the current through the motor was limited. This establishes a maximum speed attainable during regeneration without losing braking action. Beyond that limit, current was reduced in prior art systems to eliminate the possibility of failure to commutate. That is, a regenerative phase clamp was established to eliminate the possibility of too large a negative phase angle, beyond which commutation could not be achieved; and as the phase angle approached but did not reach the regenerative phase clamp value, current was reduced. The difficulty with this is that as current is reduced, speed increases such that the electrical brake becomes ineffective and mechanical braking must be employed.

SUMMARY OF THE INVENTION

In accordance with the present invention, a new and improved control system and method for operation of mining machine traction motors and the like are provided wherein series field winding direct current traction motors are operated in series during normal, sustained operation of the machine, thereby reducing the current supplied to both motors during most of the time. At the same time, the motors can be operated in parallel, when desired, due to slippage of a wheel or wheels connected to one of two traction motors. Only a single SCR AC-DC converter is employed for both traction motors, whether operated in series or parallel, in contrast to many prior art systems wherein a separate converter is used for each motor.

Specifically, there is provided apparatus for controlling DC traction motors on opposite sides of a vehicle including means connecting the traction motors in series across the output terminals of a single SCR converter having SCR's therein. Means are provided for accelerating the motors while controlling the firing angles of the SCR's such that the current and voltage supplied to the motors increase along ramps until desired normal operating values of voltage and current are reached with the voltage across the series-connected motors being of a substantially greater value than the value it would be if the motors were connected in parallel. Means are provided for maintaining the motors in a series-connected configuration during normal and sustained operating conditions of the machine while maintaining the voltage across the motors at a substantially higher value and while maintaining a reduced current flow through both motors in series.

In the present invention, means are provided to insure that as speed goes up during braking, regenerative conditions, current is not limited which insures that there is always a braking action sufficient to stop the car. This is in contrast to prior art systems wherein current was limited and actually reduced when a regenerative phase clamp setpoint was approached but not reached to eliminate what was thought to be the possibility of too large a negative phase angle and loss of commutation. The present invention resides, in part, in the realization that the phase clamp setpoint cannot only be approached but actually can be reached without reducing current during regeneration.

The above and other objects and features of the invention will become apparent from the following detailed description taken in connection with the accompanying drawings which form a part of this specification, and in which:

FIG. 2 is a simplified schematic diagram of the control system of the present invention;

FIG. 3A is a waveform illustrating current conditions through the traction motors of FIG. 2 under acceleration, running under series operation and running under parallel operation;

FIG. 3B is a voltage waveform, corresponding in time to the waveform of FIG. 3A, showing the voltage across the drive motors during acceleration, series operation and parallel operation.

Figure 1A:
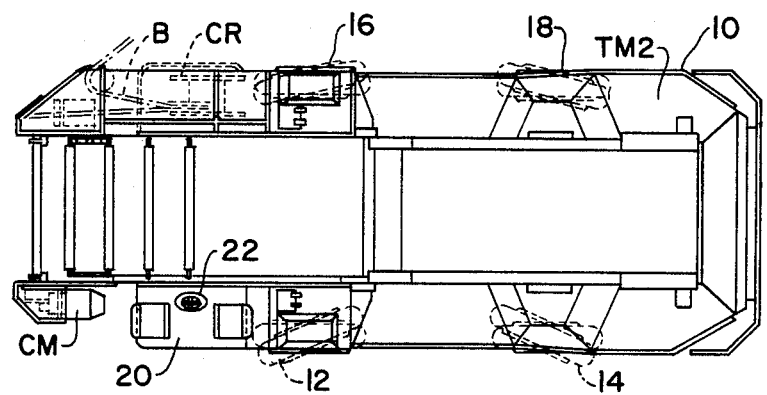
FIG. 1A is a top view of a shuttle car with which the present invention may be employed.
Figure 1B:
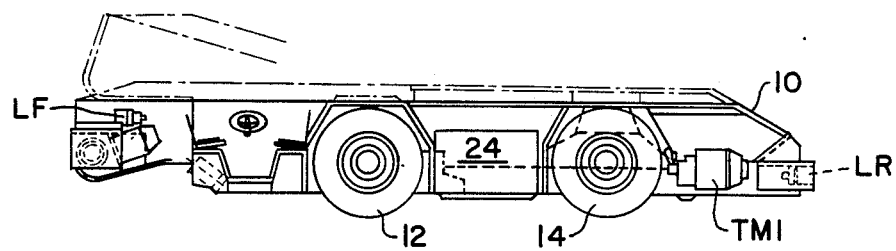
FIG. 1B is a side view of the shuttle car of FIG. 1A.

With reference now to the drawings, and particularly to FIGS. 1A and 1B, there is shown a mine shuttle car with which the control drive system of the present invention may be used. The shuttle car comprises a four-wheeled vehicle including a body 10 and four wheels 12, 14, 16 and 18 on which pneumatic tires are mounted. An operator's station 20 is provided together with a steering wheel 22 for steering the vehicle.

The wheel pairs on each side of the shuttle car are driven by separate DC traction motors. The left wheel pair 12–14 is driven by a traction motor TM1 (FIG. 1B) and the right wheel pair 16–18 is driven by a second traction motor, hereinafter designated as TM2 but not shown in FIGS. 1A and 1B. In this manner, a positive traction drive is provided for the shuttle car through the use of independent drives for the left and right wheel pairs. Electrical power is supplied to the shuttle car via a trailing cable B which comprises a three-phase AC cable connected at one end to a three-phase AC source and at the other end through slip rings on a cable reel CR to a phase-controlled SCR AC-to-DC converter 24 (FIG. 1B). As the shuttle car moves in one direction, the cable B is unwound from reel CR; and as it moves in the opposite direction the cable is rewound onto the reel.

The SCR drive 24 is shown in FIG. 2 connected to a three-phase power supply through conductors 1A, 1B and 1C which extend through the cable B. The SCR drive 24 has two output terminals, one of which is connected through a field winding 26 to the armature 28 of the first traction motor TM1. The other output terminal of the SCR drive 24 is connected through field winding 30 to the armature 32 of the second traction motor TM2. The motors TM1 and TM2 can be connected in parallel across the output terminals of the SCR drive 24 by closing relay contacts P1 and P2 while relay contact S is open. When it is desired to operate the motors TM1 and TM2 in series, relay contact S is closed while contacts P1 and P2 are open. Operator commands, schematically illustrated by the block 34 in FIG. 2 are fed through a logic circuit 36 to an SCR control or firing circuit 38, which, in turn, controls the firing angles of the phase-controlled SCR's in drive 24. Individual voltages across the armature of motors TM1 and TM2 are fed back to the SCR control circuit 38, this feedback being schematically illustrated at 40. Similarly, the current output of the SCR drive is fed back to the SCR control circuit 38 via current feedback 42.

It will be appreciated, of course, that the schematic illustration of FIG. 2 is highly simplified and that in an actual installation, relay contacts are provided which can cause the motors to assume the following operating conditions:
1. Both motors forward.
2. Both motors reverse.
3. One motor reverse and one motor forward.
4. A single motor—either forward or reverse.

The general operation of the drive system of the invention is shown in FIGS. 3A and 3B. When power is initially supplied to the motors at time A, both current and voltage increase along ramps 44 and 46 until the desired speed is attained. At point B, current and voltage remain constant with the voltage being substantially twice what it would be if the motors were connected in parallel rather than series. At the same time, the current level is essentially halved. In order to vary the speed of the motors, voltage is increased or decreased upwardly or downwardly and current varies accordingly.

In FIGS. 3A and 3B, it is assumed that at time C, one of the wheels connected to the two traction motors TM1 and TM2 is slipping. Under these conditions, it is desired to switch the motors into parallel operation with contacts P1 and P2 closed. In order to accomplish this, current and voltage initially drop to zero and then ramp up along ramps 48 and 50, respectively, to new, essentially steady-state voltage and current levels at time D. Note, however, that when the motors are operating in parallel, current has doubled while voltage has fallen to half of its original value for a given speed condition. The slippage condition described above, however, is temporary; and as soon as the slippage abates, the motors are switched back to series operation with contact S closed such that voltage is again doubled while current is halved, thereby abating heating effects.

Figure 4:
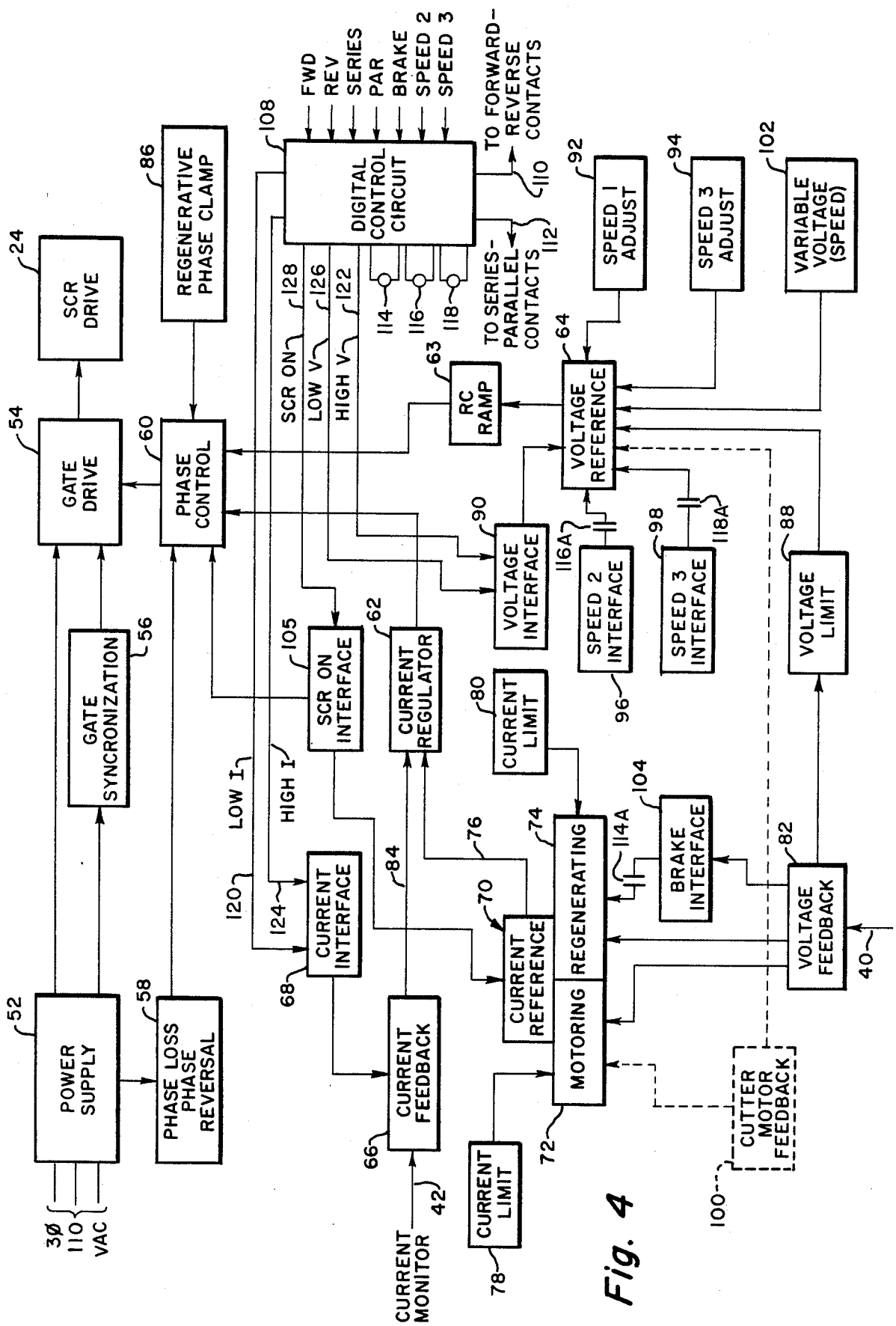
FIG. 4 is a detailed schematic block diagram of the control system of the invention.

With reference to FIG. 4, a detaled schematic block diagram of the control system of the invention is shown. A power supply 52 connected to a three-phase, 110-voltage alternating current source is connected to a gate drive 54 and to a gate synchronization circuit 56 which insures that when the unit is phased correctly, the SCR's in drive 24 fire uniformly and in the correct phase. Also connected to the power supply 52 is a phase loss and phase reversal circuit 58 which monitors the alternating current power being fed to the power supply 52 and monitors to determine if the power supply 52 has been phased properly and that all phases are present. If either of the above conditions are not met, circuit 58 inhibits a phase control circuit 60 which, in turn, controls the gate drive 54 and prevent the phase control circuit from firing the SCR's in circuit 24. The power actually used to turn ON the power SCR's in bridge circuit 24 is supplied by the gate drive circuit 54.

Phase control circuit 60 controls the actual phase angles at which the SCR's in circuit 24 fire. These phase angles can vary from angles represeting negative voltage (used during regenerative braking) to angles representing full conduction or complete rectification. The phase control circuit, in turn, is controlled by a current regulator 62 or a voltage reference circuit 64. The circuit 62 or 64 which controls the phase control circuit 60 at any one time is determined by the level of the signals at the outputs thereof. That is, the lower of the two signals from circuits 62 and 64 dictates the phase control outputs to the gate drive 54 and, hence, the firing angles of the SCR's in bridge 24.

In the phase control circuit 60, the voltage reference signal from circuit 64 determines the maximum angle of conduction of the power SCR's in circuit 54 which, in turn, determines the maximum output voltage. On the other hand, the current regulator 62 can cause this conduction angle and, therefore, the voltage to decrease below the voltage level set by circuit 64 but cannot increase the conduction angle above the point prescribed by the voltage reference. It is in this manner that the drive is essentially a current control unit with operator selectable voltages. It will be appreciated, of course, that the alternating current supplied to the SCR drive 24 passes through a complete 360° sine wave. As is known, a sine wave consists of a positive portion, lasting 180°, and a negative portion also lasting 180°. If the SCR's in drive 24 are fired in the 0°–180° range of the sine wave voltages applied thereto, positive direct current voltage is produced at the output of drive 24 to cause motoring action of the motors TM1 and TM2, for example. However, in the 180°–360° range, a negative voltage is produced by the motors acting as generators which produces a braking torque if the motor is being driven as, for example, when the vehicle is rolling downhill on a incline.

The circuitry of FIG. 4 includes a current feedback circuit 66 connected to current monitor 42 derived from the output of the SCR drive circuit 24. This circuit monitors the output current of the drive 24 and provides a low level direct current signal proportional to current for use in the current regulator circuit 62. Also connected to the current feedback circuit 66 is a current interface circuit 68, digital in operation, which establishes the current output level from drive 124 when the two motors TM1 and TM2 operate simultaneously in parallel. It also establishes the output current level when only one motor is being driven or two motors are being driven in series simultaneously. As was explained above, when both motors are operated in parallel simultaneously, current is increased above the level at which they operate when both are connected in series.

A current reference circuit 70 is provided which includes two subcircuits 72 and 74, one of which is operable during motoring conditions and the other of which is operable during regeneration conditions when motors TM1 and TM2 produce a braking effect. The motoring portion 72 of the current reference circuit 70 includes an R-C ramp circuit, not shown, which produces a low level direct current voltage that ramps from slightly above zero to a preset level to develop the ramps shown in FIGS. 3A and 3B. This voltage and its accompanying ramp are applied to the current regulator via lead 76. The regenerative portion 74 of circuit 70 also includes an R-C ramp circuit and operates in the same manner but under a different ramp and to a different level. That is, under regenerative braaking conditions, the slope of the ramp is much greater such that the desired regenerative current level is reched in one-third the time it takes to ramp the current to its desired operating level during motoring conditions. This insures that braking action occurs quickly. Maximum current under motoring and regenerating conditions is established by current limit circuits 78 and 80. Only one of the circuit portions 72 or 74 and its accompanying current limit circuit 78 or 80 is operable at any one time. A voltage feedback circuit 82, responsive to the voltages across the motor armatures, determines which one of the circuit portions 72 or 74 is in operation. In this respect, during motoring conditions, the voltage across the motors TM1 and TM2 which are fed back to the circuit 82, will be of one polarity and under regenerating conditions will be of the opposite polarity. Motoring circuit portion 72 is always operative until the motors are reversed and a motor or motors create a negative voltage across the SCR drive circuit 24.

The current regulator circuit 62 compares a signal on lead 84 from current feedback circuit 66 with the signal on lead 76 from current reference circuit 70. Current regulator 62 attempts to keep the signals on leads 76 and 84 equal in a feedback servo loop arrangement wherein its output is varied to increase or decrease motor current, depending upon the magnitudes of the signals on leads 76 and 84. If the feedback signal on lead 84 attempts to exceed the reference signal on lead 76, regulator 62 decreases its output to the phase control circuit 60 which, in turn, decreases the conduction and firing angles of the SCR's to lower current to the motors TM1 and TM2. Conversely, if the motors are drawing less current (i.e., with a reduced feedback signal applied to circuit 66), the current regulator 62 will increase its output to the phase control circuit 60 to increase the firing angles of the SCR's in circuit 24, thereby increasing output voltage and current. Also connected to the phase control circuit 60 is a regenerative phase clamp circuit 86 which regulates the phase control circuit to insure that the possibility of too large a negative phase angle during regeneration conditions does not occur.

As was explained above, the voltage feedback circuit 82 senses the voltage across each motor TM1 and TM2 independently and senses whether the voltage is too high at either motor or if a negative voltage is present across the SCR drive 24 when the motors have been reversed while they are still running. If the circuit 82 detects a negative voltage, it then activates regenerative portion 74 of current reference circuit 70 while disabling the motoring portion 72. On the other hand, when a negative voltage feedback is no longer present, voltage feedback circuit 82 disables the regenerative portion 74 and enables the motoring portion 72 of current reference circuit 70.

If the voltage feedback circuit 82 detects a voltage across either motor TM1 or TM2 in excess of an internally-set limit, it will apply a signal to a voltage limit circuit 88 which actuates voltage reference circuit 64 to lower its output. When this occurs, phase control circuit 60, through gate drive 54, reduces the firing angles of the SCR's in circuit 24 to the point where the excess voltage is reduced to acceptable levels.

A voltage interface circuit 90 is provided which establishes two sets of voltage reference points. When the two motors TM1 and TM2 are being driven simultaneously in series, one set of voltage reference points is established for first, second and third motor speeds. When either one motor is being driven by itself or two motors driven in parallel, another set of voltage reference points is established for first, second and third speeds. By virtue of the fact that circuit 90 can establish two sets of voltage references, motor speed can be regulated from zero to full speed in both the series and parallel circuit conditions.

The mining machine can operate at any one of three preset speeds. Connected to the voltage reference circuit 64 is a speed-one adjust circuit 92, a speed-three adjust circuit 94, a speed-two interface 96 and a speed-three interface 98. Speeds one and three can be preset by the operator; while speed two is programmed into voltage reference circuit 64. By controlling a resistor in the circuit 92, the speeds of the motors TM1 and TM2 can be varied from +15% to −60% of nominal. By adjusting a resistor in circuit 94, the speed of the motors may be adjusted from nominal to +15%. The speed-two interface 96, activated by appropriate digital circuitry, not shown, changes the voltage reference from a level producing a first speed to a level producing a second speed. This is used in conjunction with the voltage interface circuit 90 such that the second speed output voltage per motor remains constant in series or parallel. The function of circuit 98 is the same as that of circuit 96 except that the output voltage now becomes that of a third speed. As will be understood, the voltage reference circuit determines the upper limit to which the phase control circuit 60 can turn ON the SCR's. The voltage reference circuit 64 always establishes the first speed for the series connection unless acted upon by many of its governing circuits. The output of the voltage reference circuit is connected to the phase control circuit 60 through an R-C ramp circuit 63 which determines the slopes of the voltage ramps shown in FIG. 3B.

In the case where a control system is used on a mining machine equipped with a cutter motor, an optional current feedback control circuit 100 can be included. Applied to the circuit 100 is a current signal, derived from a cutter motor monitor, not shown which is proportional to the cutter motor current. In circuit 100, the current signal is converted into a direct current voltage which acts to retard the traction system during difficult cutting conditions when the torque exerted by the cutter motor increases. As the cutter motor current increases, the firing angles of the SCR's in circuit 24 are reduced to reduce voltage and speed across the motors. By varying the machine movement rate in this manner, an optimum cutting speed can be achieved without constant operator control.

The circuit of FIG. 4 also includes a variable voltage speed control circuit 102, under the control of the operator, which can override circuits 92-98 and is connected to the voltage reference circuit 64. By varying the voltage from circuit 102 fed to voltage reference circuit 64, the SCR drive output 24 can be increased from zero volts to full conduction until the voltage limit prescribed by voltage limit circuit 88 is reached. Zero to full speed operation in this manner is possible with either a series or parallel combination of the motors TM1 and TM2.

A brake interface circuit 104 is provided which is activated by digital circuitry and causes the current reference circuit, via its portion 74 to regeneratively brake the motor to a stop. During braking, current to the motor is limited by the regenerative phase clamp 86 to insure that there is always a braking action sufficient to stop the car. The signal from the voltage feedback circuit 82 also determines when the motor is no longer regenerating. This signifies that the motor is stopped and no longer needs braking. At this time, brake interface 104 is deactivated. The circuit of FIG. 4 also includes an SCR "ON" interface circuit 105. If conditions are satisfactory, the SCR's are activated, permitting the current regulator 62 to produce an output signal which, through phase control circuit 60 turns ON the SCR's in circuit 24 to a level selected by the current regulator 62 and the voltage reference circuit 64. If conditions are not appropriate for the SCR's to be firing, the circuit 105 clamps the current reference circuit 70, the current regultor 62 and the phase control circuit 60 to zero, thereby preventing firing of the SCR's.

The functions generated by the various circuits thus far described in FIG. 4 are controlled by a digital control circuit, generally indicated by the reference numeral 108. Applied to the digital control signal are manual operator inputs. These include a forward input (FWD), a reverse input (REV), a series input, a parallel input, a brake input, and speed-two and speed-three inputs. As was mentioned above, if the operator does not input speed-two or speed-three, then the voltage reference circuit 64 outputs a voltage which causes the vehicle to operate at speed-one, this being a pre-programmed speed.

The manual operator inputs are used to control switches in the digital control circuit 108. Thus, if it is desired to move forwardly, a forward switch is closed in circuit 108; if it is desired to reverse the machine, a reverse switch is closed, and so on. When either the forward or reverse switch is closed, circuit 108 actuates a corresponding relay, not shown, which closes selected ones of forward and reverse contacts for the motors TM1 and TM2 shown in FIG. 2. The connection between circuit 108 and the motors is schematically illustrated by the lead 110 shown in FIG. 4. These forward and reverse contacts are not shown in FIG. 2 but are, of course, well within the skill of the art. Depending upon whether the series input or parallel input is applied to digital circuit 108 by the operator, either contacts P1 and P2 of FIG. 2 will be closed or contacts S. That is, the digital control circuit 108 energizes relays which actuate the contacts P1 and P2 or contacts S shown in FIG. 2, the connection between the digital control circuit 108 and the respective contacts being indicated by the lead 112 in FIG. 4. It will be understood, of course, that in an arrangement wherein forward or reverse operation of the motors is effected, a greater number of contacts will be required than that shown in FIG. 2.

Assuming that a brake signal is applied to the digital control circuit 108, it will energize relay 114 which, in turn, closes contact 114A between the brake interface 104 and the regenerating portion 74 of the current reference circuit 70. This occurs, of course, only when the operator manually closes a brake switch in the digital control circuit 108 to effect a braking function. When a speed-two signal is entered into the digital control circuit 108, relay 116 is energized, thereby connecting the speed-two interface 96 to the voltage reference circuit 64 via contacts 116A. Finally, when a speed-three signal is entered into the digital control circuit 108 by the operator, relay 118 is energized to close normally-open contacts 118A, thereby connecting the speed-three interface 98 to the voltage reference circuit 64. While only single forward and reverse inputs are applied to the control circuit 108 for a shuttle car such as that shown in FIGS. 1A and 1B, it will be appreciated that in the case of a mining machine, for example, right forward, left forward, right reverse and left reverse signals must be entered in order to facilitate steering of the mining machine over the mine floor.

When a series input is supplied to the circuit 108 by the operator, a signal is applied to current interface 68 via lead 120 and to the voltage interface 90 via lead 122 to effect high voltage and low current conditions for series operation of the traction motors described above. On the other hand, when parallel operation of the motors is desired, as when one of the drive motors is slipping, signals are applied to circuits 68 and 90 via leads 124 and 126, respectively, to effect the low voltage and high current conditions required for parallel operation.

Digital control circuit 108 is essentially a logic circuit and incorporates means for turning on the SCR "ON" interface 105 via lead 128 only under the following conditions:

1. A directional signal must be selected by the operator (i.e., forward or reverse).

2. The directional forward and reverse signals must not be switching (i.e., a reverse signal cannot be entered when a forward signal is switching in the circuit 108).

3. The switch connected to the series-parallel inputs must not be switching.

If any of the foregoing conditions are not met, the SCR "ON" interface 105 will not be activated, nor will the SCR's in circuit 24. This insures that signals dictating different modes of operation will not be applied to the circuitry at the same time.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for controlling DC traction motors connected to drive wheels on an electrically energized vehicle comprising: means connecting said traction motors in series across the output terminals of an SCR converter having SCR's therein, means for accelerating said motors while controlling the firing angles of said SCR's such that the current and voltage supplied to said motors increase along ramps until desired normal operating values of voltage and current are reached with the voltage across the series-connected motors being of a substantially greater value than the value it would be if the motors were connected in parallel, means for maintaining said motors in a series-connected configuration during normal essentially steady-state operation of said motors while maintaining the voltage across said motors at said substantially higher value, and means for selectively connecting said motors in parallel when at least one of said drive wheels is slipping during series-connected operation of said motors.

2. The apparatus of claim 1 including means for reducing the output voltage across said SCR converter when said motors are connected in parallel.

3. The apparatus of claim 2 including means for reducing said output voltage across said SCR converter along a voltage ramp when said motors are connected in parallel while current to said motors is increased along a current ramp, the ramp action continuing until said output voltage across the parallel connected motors is essentially one-half the value of said output voltage across said series connected motors and until the current applied to said motors is essentially twice the value of the current supplied to said series connected motors.

4. The apparatus of claim 1 including means responsive to the voltages across said motors for sensing when said motors are operating under motoring or regeneration conditions, and means for controlling the phase angles at which said SCR's fire under either motoring or regeneration conditions.

5. The apparatus of claim 4 wherein said means for controlling phase angles includes a current reference circuit, a voltage reference circuit, and an SCR phase control circuit responsive to signals from the current and voltage reference circuits.

6. The apparatus of claim 5 including voltage and current feedback circuits responsive to the voltage across respective ones of said motors and the current passing through both of said motors, said voltage and current feedback circuits being connected to said voltage and current reference circuits, respectively.

7. The apparatus of claim 6 including circuitry under the control of an operator of said vehicle, which circuitry is connected to said voltage reference circuit for controlling the voltage applied to and the speeds of said motors.

8. The apparatus of claim 4 including a regenerative phase clamp circuit connected to said means for controlling the phase angles at which said SCR's fire to insure that too large a negative phase angle is not produced during regeneration conditons of said motors.

9. A method for controlling DC traction motors connected to drive wheels on an electrically energized vehicle which comprises the steps of connecting said traction motors in series across the output terminals of an SCR converter having SCR's therein, accelating said motors while controlling the firing angles of said SCR's such that the current and voltage supplied to said motors increases along ramps until desired normal operating values of voltage and current are reached with the voltage across the series-connected motors being substantially greater than the value it would be if said motors were connected in parallel, maintaining said motors in a series-connected configuration during normal operating conditions while maintaining the voltage across said motors at said substantially higher value, and selectively connecting said motors in parallel when at least one of said drive wheels in slipping during series-connected operation of said motors.

10. The method of claim 9 including the step of reducing the output voltage across said SCR converter when the said traction motors are connected in parallel while simultaneously increasing current to the said motors along a ramp.

* * * * *